United States Patent [19]
Wilfert

[11] 3,861,486
[45] Jan. 21, 1975

[54] ENERGY-ABSORBING INSTRUMENT PANEL FOR MOTOR VEHICLES

[75] Inventor: Karl Wilfert, Gerlingen-Waldstadt, Germany

[73] Assignee: Daimler-Benz Aktiengesellschaft, Stuttgart, Germany

[22] Filed: Mar. 19, 1973

[21] Appl. No.: 342,414

[30] Foreign Application Priority Data
Mar. 20, 1972 Germany............................ 2213445

[52] U.S. Cl. ................................ 180/90, 280/150 B
[51] Int. Cl. ..................... B60k 35/00, B60r 21/02
[58] Field of Search..................... 180/90; 280/150 B

[56] References Cited
UNITED STATES PATENTS
2,070,760   2/1937   Straith ................................. 180/90
3,774,713   11/1973   Stegmaier ........................... 180/90

*Primary Examiner*—Robert R. Song
*Attorney, Agent, or Firm*—Craig & Antonelli

[57] ABSTRACT

An energy-absorbing and preferably plastically deformable instrument panel for motor vehicles, especially one having a negative profile formed essentially after the contours of a seated person facing the same and an approximately table-shaped top side, in which the plastically deformable area of the instrument panel is connected with a buckling-resistant support member by way of at least one tension or draw member.

21 Claims, 4 Drawing Figures

PATENTED JAN 21 1975          3,861,486

ENERGY-ABSORBING INSTRUMENT PANEL FOR MOTOR VEHICLES

The present invention relates to an energy-absorbing and thereby preferably plastically deforming instrument panel for motor vehicles, especially with a negative profile formed approximately according to the contours of a seated person facing the same and with an approximately table-shaped top side.

With such types of instrument panels, a synthetic plastic foamed material layer having high damping effect and provided with external contours is mounted, for the most part, on a relatively thin-walled support sheet metal member. The front side of the instrument panel thereby receives such a shape and configuration that it adapts itself to the contours of a seated person facing the same. It is assured thereby that in case of a strong deceleration, a uniform abutment of the leg portions is achieved already after a short displacement path. The subsequent impact of the upper body can then be absorbed as planned by correspondingly constructed areas of the instrument panel.

It has been discovered with the deformation progress of the instrument panel connected therewith that the occuring deformation occurrences and phenomena cannot be predetermined for the most part, since too many influencing magnitudes such as, for example, differing body sizes of the passengers interact. The advantages of energy-absorbing instrument panels, however, can become fully effective only if the deformation thereof progresses in precisely predetermined phases. It cannot happen then that with body portions impinging against the top side of the instrument panel, for example, the head of the co-driver or passenger seated alongside the driver is exposed to dangerous loads and forces by a sudden uncontrolled warping or buckling of this top side area.

It is the aim of the present invention to so control by appropriate measures the deformation of energy-absorbing instrument panels that the deformation capacity is fully exploited with greatest possible yield in safety for the passengers.

Consequently, an energy-absorbing and thereby preferably plastically deforming instrument panel for motor vehicles is proposed, especially one with a negative profile formed approximately according to the contours of a person seated facing the same and with an approximately table-shaped top side, whereby according to the present invention the plastically deformable area of the instrument panel is in operative connection with a buckling-rigid support member by way of at least one tension or draw member.

In one embodiment of the present invention, a smooth and/or folded sheet metal section or sheet metal strip may be provided as tension or draw member.

However, also, for example, a chain-like or cable-like tension or draw means may be used as tension member.

A slight displacement in height on the part of the base of the head impact area occurs if the tension or draw member or members extend initially approximately in the extension of the knee impact area of the instrument panel.

Different coordinations between the magnitude of the displacement in the longitudinal direction and the shape and/or timely construction of the head impact area can be achieved if each tension or draw member comes into abutment during the deformation phase of the instrument panel at a coordinated roll-off surface rigidly connected with the support member. This roll-off surface may be formed out of the support member itself but may also represent an independent structural part.

It may be of advantage if the support member is constructed multi-partite and the sections are displaceable relative to one another under energy absorption after reaching a predetermined load or stress.

This displacement occurs appropriately when the deformation capacity of the instrument panel itself is exhausted.

Accordingly, it is an object of the present invention to provide an energy-absorbing and plastically deformable instrument panel for motor vehicles which avoids by simple means the aforementioned shortcomings and drawbacks encountered in the prior art.

Another object of the present invention resides in an energy-absorbing and plastically deformable instrument panel for motor vehicles which makes possible an accurate predetermination of the various phases of the deformation thereof.

A further object of the present invention resides in an energy-absorbing instrument panel of the type described above which assures maximum safety for the passengers by insuring complete and full exploitation of the deformation capacity of the instrument panel.

Still another object of the present invention resides in an energy-absorbing and plastically deformable instrument panel for motor vehicles in which the body parts of the passengers are reliably protected by controlled deformation of the surfaces of the instrument panel.

These and further objects, features and advantages of the present invention will become more apparent from the following description when taken in connection with the accompanying drawing which shows, for purposes of illustration only, two embodiments in accordance with the present invention, and wherein.

Figure 3:
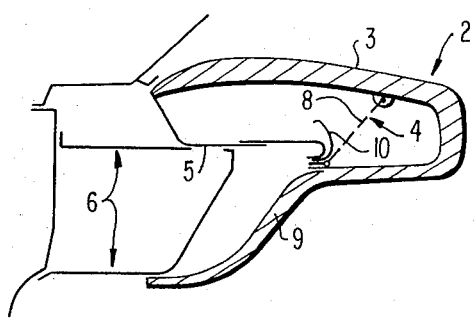
Figure 4:
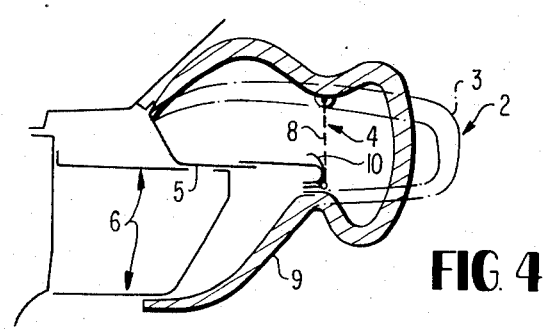

FIG. 3 is a partial instrument cross-sectional view through a modified embodiment of an instrument panel in accordance with the present invention in the normal position of the instrument panel which is provided with a roll-off surface formed by a separate structural part; and FIG. 4 is a schematic partial cross-sectional view illustrating the instrument panel of FIG. 3 in the condition after an accident.

Figure 1:
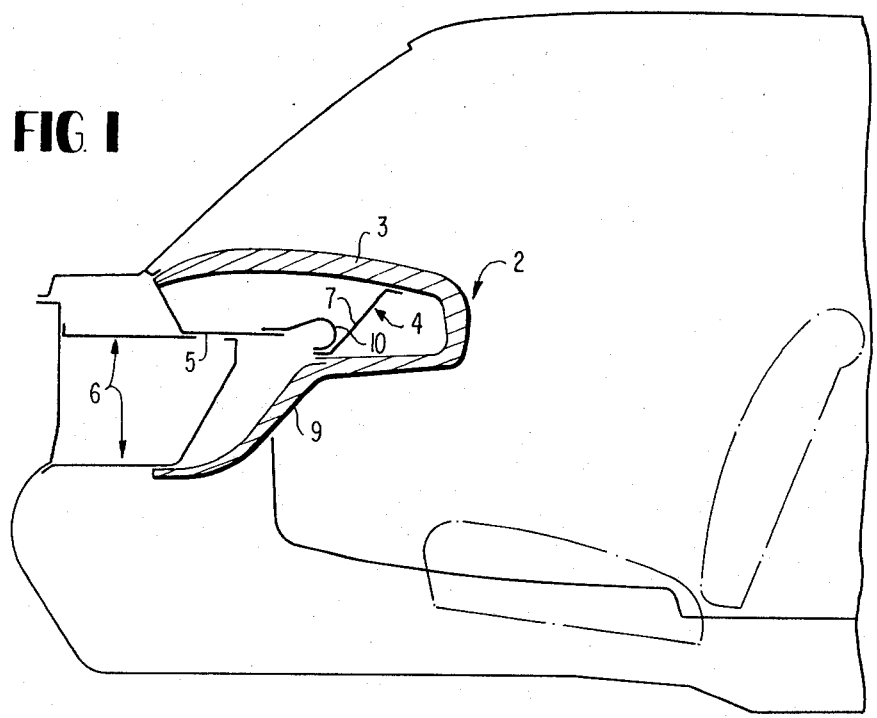
FIG. 1 is a schematic cross-sectional view through an instrument panel in accordance with the present invention in the normal condition of the instrument panel which is provided with a roll-off surface formed by the support member.
Figure 2:
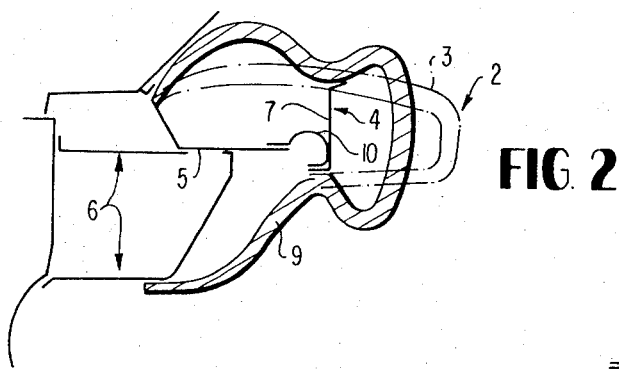
FIG. 2 is a partial schematic cross-sectional view illustrating the instrument panel of FIG. 1 in its extreme position after an accident.

Referring now to the drawing wherein the reference numerals are used throughout the various views to designate like parts, and more particularly to FIG. 1, reference numeral 1 designates in this figure a motor vehicle which is indicated only schematically and which includes an instrument panel generally designated by reference numeral 2. The instrument panel 2 has a negative profile formed approximately after the contour lines of a person seated facing the same and an approximately table-shaped top side 3. The plastically deformable area of the instrument panel 2, illustrated in particular in FIGS. 2 and 4, is connected with a buckling-resistant or buckling stiff support member 5 by way of at least one tension or draw member generally designated by reference numeral 4. This support member 5 may be component of a vehicle cross bearer 6.

In FIGS. 1 and 2, a smooth, flat sheet metal section 7 serves as draw or tension member 4. However, also folded sheet metal section or sheet metal strip could be used which is extended or stretched under energy absorption and which is so arranged that during the deformation action of the instrument panel 2, the table-shaped configuration of its top side 3 is far-reachingly preserved.

In the embodiment according to FIGS. 3 and 4, for example, a chain-like or cable-like tension or draw means 8 serves as tension or draw member 4.

The draw or tension members 4 extend preferably in extension of the knee impact area 9 of the instrument panel 2 and support themselves or abut during the deformation phase at a coordinated roll-off surface 10 rigidly connected with the support member 5. This roll-off surface 10 may be formed out of the support member 5 itself (FIGS. 1 and 2), however, it may also form a separate structural element (FIGS. 3 and 4). Differing deformation progresses of the top side 3 of the instrument panel can be achieved during the deformation phase by the shape of this roll-off surface 10.

In both embodiments, the support members 5 are constructed multi-partite and are so connected with each other by conventional means that after reaching a predetermined load, a relative displacement of the individual parts can take place with respect to one another under energy absorption. During this operation, the attained configuration of the top side 3 is far-reachingly maintained.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. An energy-absorbing, deformable instrument panel for motor vehicles having a plastically deformable area, comprising a buckling resistant support means, and at least one tension means for operatively connecting said buckling resistant support means with the plastically deformable area of the instrument panel.

2. An instrument panel according to claim 1, wherein the instrument panel is plastically deformable.

3. An instrument panel according to claim 1, wherein the instrument panel has a negative profile formed approximately according to the contour lines of a person seated in the motor vehicle facing the same, said instrument panel being provided with an approximately table-shaped top side.

4. An instrument panel according to claim 1, wherein said tension means includes a sheet metal member.

5. An instrument panel according to claim 4, wherein said sheet metal member is substantially flat.

6. An instrument panel according to claim 4, wherein said sheet metal member is folded.

7. An instrument panel according to claim 4, wherein said sheet metal member is constituted by a sheet metal section.

8. An instrument panel according to claim 4, wherein said sheet metal member is a sheet metal strip.

9. An instrument panel according to claim 1, wherein said tension means is a chain-like tension means.

10. An instrument panel according to claim 1, wherein said tension means is a cable-like tension means.

11. An instrument panel according to claim 1, wherein the instrument panel includes a knee impact area disposed beneath the plastically deformable area of the instrument panel, and wherein said tension means has an initial and deformed position, said tension means in said initial position extending approximately in the extension of said knee impact area of the instrument panel.

12. An instrument panel according to claim 11, wherein a roll-off surface means is rigidly connected with said buckling resistant support means, said roll-off surface means being disposed between said tension means and said buckling resistant support means, and wherein, during the deformation phase of the instrument panel, each tension means is displaced to said deformed position, said tension means in said deformed position abutting said roll-off surface means.

13. An instrument panel according to claim 12, wherein said buckling resistant support means is constructed of a plurality of individual support sections, each of said support sections being mounted in the instrument panel so as to be displaceable relative to one another under energy-absorption after reaching a predetermined load.

14. An instrument panel according to claim 13, wherein said tension means is a sheet metal member.

15. An instrument panel according to claim 14, wherein said sheet metal member is substantially flat.

16. An instrument panel according to claim 14, wherein said sheet metal member is folded.

17. An instrument panel according to claim 13, wherein said tension means is a chain-like tension means.

18. An instrument panel according to claim 13, wherein said tension means is a cable-like tension means.

19. An instrument panel according to claim 13, wherein the instrument panel has a negative profile formed approximately according to the contour lines of a person seated in the motor vehicle facing the same, and wherein the instrument panel is provided with an approximately table-shaped top side.

20. An instrument panel according to claim 1, wherein a roll-off surface means is rigidly connected with said buckling resistant support means, said roll-off surface means being disposed between said tension means and said buckling resistant support means, and wherein each of said tension means has an initial and deformed position, each tension means, during the deformation phase of the instrument panel, is displaced to said deformed position, said tension means in said deformed position abutting said roll-off surface means.

21. An instrument panel according to claim 1, wherein said buckling resistant support means is constructed of a plurality of individual support sections, each of said support sections being mounted in the instrument panel so as to be displaceable relative to one another under energy-absorption after reaching a predetermined load.

* * * * *